Jan. 5, 1960
L. H. LIGHT
2,920,259
DIRECT CURRENT CONVERTER
Filed Nov. 28, 1956
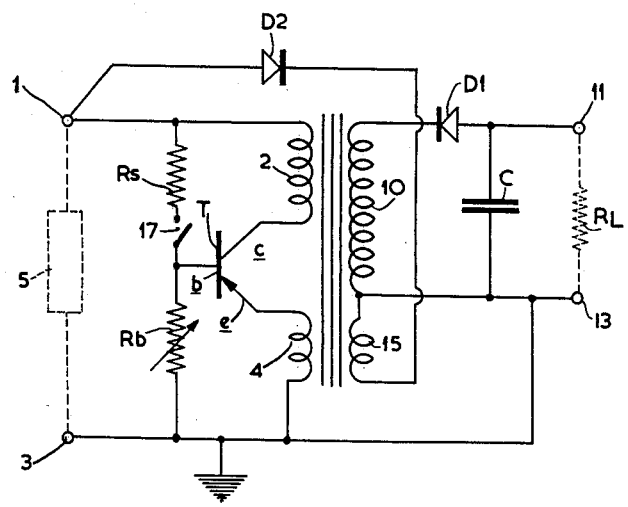
INVENTOR
LEON HENRY LIGHT
BY Fred M. Vogel
AGENT

United States Patent Office 2,920,259
Patented Jan. 5, 1960

2,920,259
DIRECT CURRENT CONVERTER

Leon Henry Light, London, England, assignor, by mesne assignments, to North American Philips Company, Inc., New York, N.Y., a corporation of Delaware Application November 28, 1956, Serial No. 624,805

Claims priority, application Great Britain January 27, 1956

5 Claims. (Cl. 321—2)

This invention relates to circuit arrangements for D.C. converters employing transistor oscillators and more particularly to circuit arrangements wherein a relaxation oscillator comprising a transistor is caused to generate oscillations which are rectified to provide the D.C. output.

It has been proposed to arrange two transistors in a push-pull relaxation oscillator circuit with an output transformer providing also feedback coupling between the collector-emitter circuit of each transistor and its base, said transformer having a saturable core which terminates the forward stroke of the relaxation cycle by the action of magnetic saturation.

In some D.C. converter applications it is desirable to employ an asymmetrical oscillator using a single transistor, and in an asymmetrical circuit there are disadvantages resulting from ringing due to the energy stored in the magnetic core at the end of the forward stroke. The ringing voltages may be so large as to cause damage to the rectifier and/or the transistor. On the other hand, if the high frequency ringing voltages are made to cause half-cycles of energy to pass into the output circuit by the provision of a rectifier, the regulation of the converter is thereby greatly impaired. It is an object of the invention to provide an improved circuit arrangement in which such disadvantages are overcome or minimized.

According to the invention, a circuit arrangement for a D.C. converter comprises a pair of D.C. input terminals, a pair of output terminals for connection to a load, a relaxation oscillator employing a transistor with a transformer for feedback coupling between its collector-emitter circuit and its emitter-base circuit, means for rectifying oscillatory voltages derived from an output winding of said transformer so as to provide a D.C. voltage at said output terminals, means for terminating the forward or conducting stroke of each oscillation by causing said transistor to cut off, and an energy recovery circuit comprising a further winding on said transformer connected through a further rectifier to the input terminals, said recovery circuit being provided for transferring to said input terminals during the fly-back or cut-off stroke energy stored during the forward or conducting stroke.

Preferably the means for terminating the forward or conducting stroke comprise a magnetic core in said transformer which core is adapted to become magnetically saturated during the end portion of said stroke.

The turns ratio between the recovery winding and the other windings must be such that the major portion of the stored energy is transferred during fly-back to such D.C. input source as may be connected to the input terminals in a direction such as to charge said source. On the other hand, the turns ratio between the recovery winding and a primary winding connected to the collector should be chosen to be such that the collector voltage is not excessive during fly-back. If a D.C. input source having relatively high internal impedance is used, or if charge currents are liable to damage the input source, a capacitor of large value may be connected across the input terminals in parallel with the source. The recovery winding may not be a separate winding and may be a tapped portion of a larger winding which may comprise also the output winding in the manner of an auto-transformer. The direction of conduction of the two rectifiers must be so arranged that one rectifier conducts only during the forward or output stroke while the other rectifier conducts only during the fly-back or recovery stroke. As a consequence of the mode of operation described, the value of the D.C. output voltage is dependent primarily upon the turns ratio between the primary and output windings.

A preferred embodiment of the invention employing a P–N–P junction transistor will now be described by way of example with reference to the accompanying drawing.

Referring now to the drawing, a transistor T has its collector $c$ connected to an input terminal 1 via a primary transformer winding 2 and its emitter connected to the other input terminal 3 via a feed-back coupling winding 4. In operation, the input terminals 1, 3 may be connected to a battery 5 as shown in dotted lines which battery may have for example a voltage of about 3 volts. The secondary output winding 10 has an appropriate turns ratio with respect to primary winding 2 to provide the desired output voltage, and has one end connected to output terminal 11 via a rectifier D1 and its other end connected to the other output terminal 13. A smoothing capacitor C is connected across the output terminals 11, 13 and in operation the latter are connected to a load $R_L$ as shown in dotted lines. The terminal 13 is earthed and is connected through a recovery winding 15 and a second rectifier D2 to the input terminal 1.

In addition to the above, a starter circuit is connected between the base $b$ and the input terminals, such circuit comprising resistances $Rs$ and $Rb$ and a switch 17. When switch 17 is closed for starting purposes, the potential divider $Rs$—$Rb$ provides the base with a potential slightly negative with respect to earth. After starting has been effected, the switch may be opened in the interests of battery economy.

The operation of the circuit illustrated is as follows:

When the input voltage is applied to the circuit, transistor T begins to conduct current which flows through primary 2. The increasing current through primary 2 produces a negative voltage at the base end of winding 4 thus causing emitter-base current to flow and thereby making the voltage drop between collector and emitter very low. Thus substantially the whole of the voltage of the battery 5 is applied across the inductance of the primary 2 during the forward stroke; this produces a substantially linear rate of rise of current through the primary and hence a constant D.C. voltage across the winding 4. This in turn results in a substantially constant emitter current of a certain value. These conditions hold good until the collector current reaches a value such as to saturate the core of the transformer. On reaching saturation, the rise of current through the primary becomes steeper owing to the reduced impedance of the primary winding while at the same time the transformer coupling is reduced. Either or both these effects in turn remove the transistor from the bottomed condition so that its emitter-collector voltage must rise and consequently a smaller fraction of the battery voltage is applied to the primary 2. Thus, because of the transformer action, the voltage applied to the emitter and base by the winding 4 must also decrease. This arrests the steepened rise in collector current and a cumulative action ensues with the collector current decreasing and thereby inducing a voltage of opposite polarity in the winding 4 so that the collector current is cut off abruptly.

During the forward stroke described above, current is induced from primary 2 to the output secondary 10, the current in secondary 10 being rectified by D1 and smoothed by capacitor C for supply to the load $R_L$.

When the forward or conducting stroke is terminated by saturation of the core, the energy stored in the core must, as explained previously, be dissipated to prevent ringing effects. This is effected during the flyback or recovery stroke by current induced in the recovery winding 15 by the collapse of the magnetisation of the core.

The direction of conduction of rectifier D2 is such as to pass such current back to the battery 5, and during flyback the voltage of winding 15 rises until it is sufficiently high to overcome the voltage of battery 5 and pass current through the latter in its reverse or charging direction.

As explained previously, the output voltage is largely independent of the load and depends primarily on the turns ratio between windings 2 and 10. For the sake of illustration, a suitable turns ratio for an output voltage of 150 (with an input voltage of 10 v.) is 150÷2250, corresponding suitable turns for windings 4 and 15 being 12 and 150 respectively.

What is claimed is:

1. A circuit arrangement for a direct current converter comprising: a pair of D.C. input terminals, a pair of output terminals for connection to a load, a relaxation oscillator including a transistor having emitter, base and collector electrodes coupled to said input terminals, said electrodes being connected in a collector-emitter circuit and an emitter-base circuit, and a transformer intercoupling said collector-emitter circuit and said emitter-base circuit in feedback relationship, means comprising an output winding on said transformer for developing an oscillatory voltage from said transistor, first rectifier means for rectifying said oscillatory voltage, said rectifier means being connected between said output winding and said output terminals, means for terminating the conducting stroke of each oscillation of the relaxation oscillator by causing said transistor to cut off, and an energy recovery circuit comprising an additional winding on said transformer and a second rectifier connected in series with said additional winding across said input terminals, said recovery circuit transferring to said input terminals, during the fly-back stroke of each said oscillation of the relaxation oscillator, energy stored in said transformer during the conducting stroke.

2. A circuit arrangement according to claim 1, wherein the means for terminating the conducting stroke comprises a magnetic core of said transformer, said core being adapted to become magnetically saturated during the end portion of said conducting stroke.

3. A circuit arrangement according to claim 2 wherein said transformer comprises a primary winding connected between said collector electrode and one of said input terminals and a feedback coupling winding connected between said emitter electrode and the other one of said input terminals.

4. A circuit arrangement according to claim 1, said base electrode being coupled to said input terminals through a starter circuit comprising a resistor and a normally open switch connected in series between said base electrode and one of said terminals, the closure of said switch operating to bias said base electrode through said resistor thereby to initiate operation of the circuit.

5. A circuit arrangement for a direct current converter comprising: a pair of D.C. input terminals, a pair of output terminals for connection to a load, a relaxation oscillator including a transistor having emitter, base and collector electrodes coupled to said input terminals, said electrodes being connected in a collector-emitter circuit and an emitter-base circuit, an inductive connection intercoupling said collector-emitter and emitter-base circuits in feedback relationship, inductive means for developing an oscillatory voltage from said transistor, rectifier means for rectifying said oscillatory voltage, said rectifier means being connected between said inductive means and said output terminals, said base electrode being coupled to said input terminals through a starter circuit comprising a resistor and a normally open switch connected in series between said base electrode and one of said terminals, the closure of said switch operating to bias said base electrode through said resistor thereby to initiate operation of the circuit.

References Cited in the file of this patent

UNITED STATES PATENTS

| | | |
|---|---|---|
| 2,748,274 | Pearlman | May 29, 1956 |
| 2,757,243 | Thomas | July 31, 1956 |
| 2,774,878 | Jensen | Dec. 18, 1956 |
| 2,780,767 | Janssen | Feb. 5, 1957 |
| 2,782,310 | Kabell | Feb. 19, 1957 |
| 2,783,384 | Bright et al. | Feb. 26, 1957 |
| 2,791,739 | Light | May 7, 1957 |